Nov. 20, 1951  A. R. GOW ET AL  2,575,414
MOLDED ATHLETIC BALL WITH LACING GRIP
Filed Oct. 26, 1946  2 SHEETS—SHEET 1
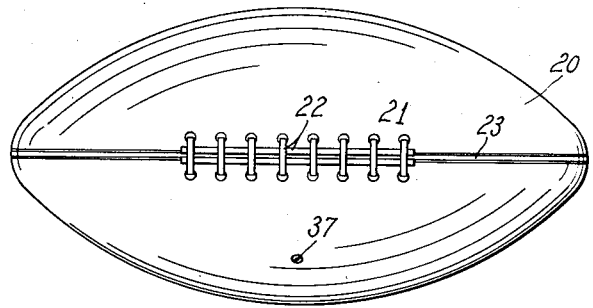
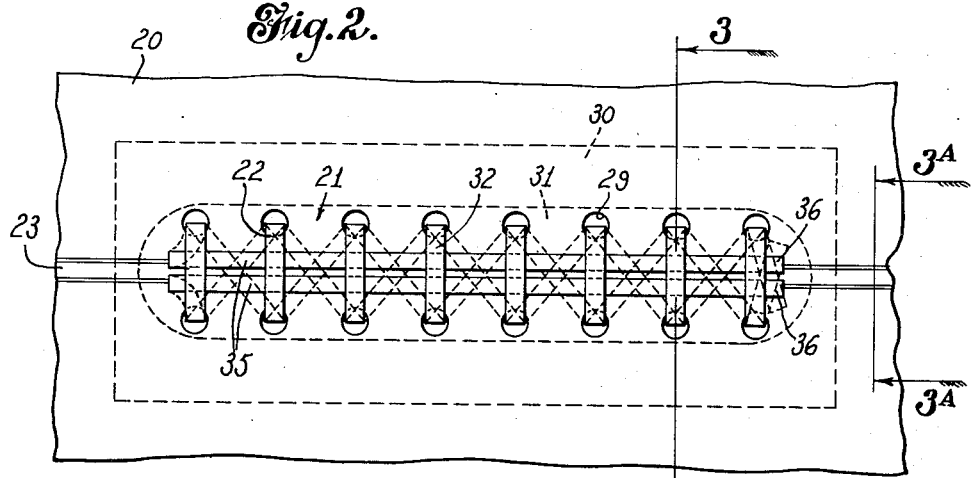
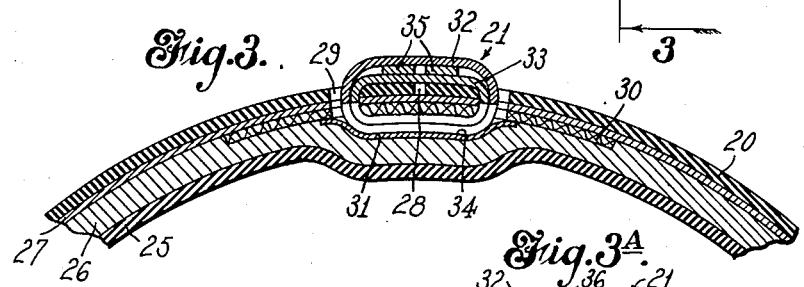
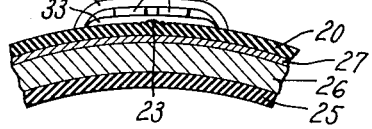
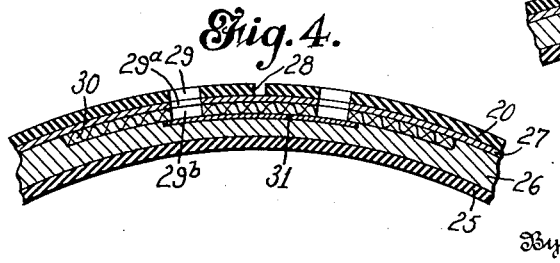
Inventor
Arthur R. Gow &
Cornelius J. Crowley
By Rockwell & Bartholow
Attorneys Nov. 20, 1951 A. R. GOW ET AL 2,575,414
MOLDED ATHLETIC BALL WITH LACING GRIP
Filed Oct. 26, 1946 2 SHEETS—SHEET 2
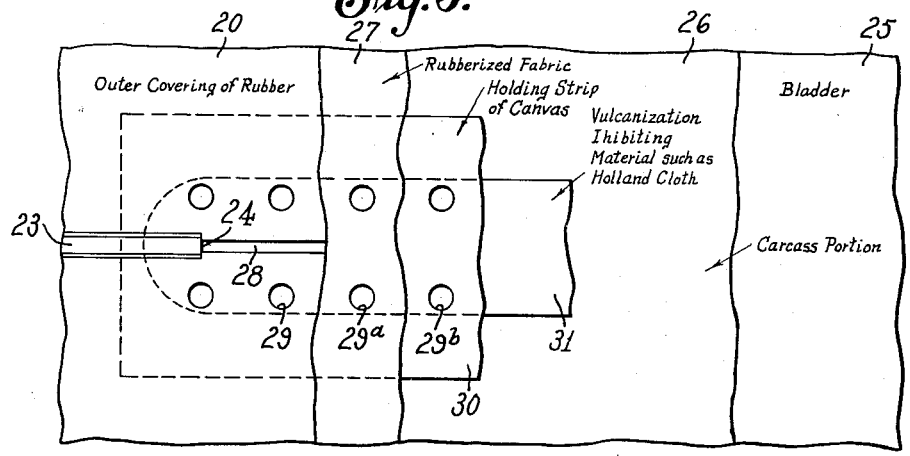
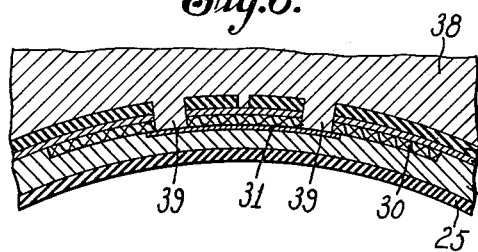
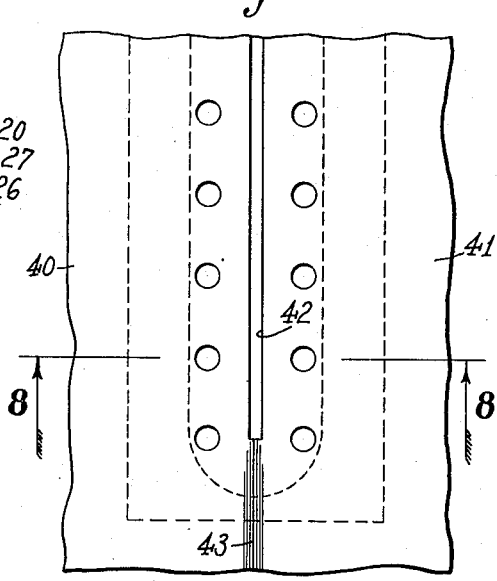
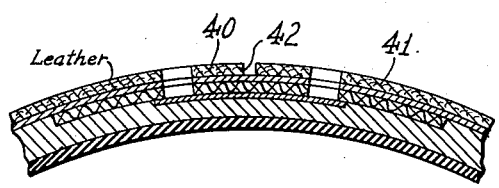

Patented Nov. 20, 1951

2,575,414

UNITED STATES PATENT OFFICE 2,575,414

MOLDED ATHLETIC BALL WITH LACING GRIP

Arthur R. Gow, Hamden, and Cornelius J. Crowley, New Haven, Conn., assignors to The Seamless Rubber Company, New Haven, Conn., a corporation of Connecticut Application October 26, 1946, Serial No. 705,938

10 Claims. (Cl. 273—65)

This invention relates to athletic balls, and more particularly to inflatable balls such as footballs, basketballs, and the like, in which a so-called carcass is used, covered over at the exterior by a finishing layer of suitable material.

The invention is particularly applicable to footballs such as used in college football, for example, where the ball is non-spherical and is used in throwing passes, but it is not limited to such balls.

Where, in executing a pass, a ball which is generally of oval shape is grasped in one hand, it is important that the player's hand have an especially firm grip on the ball. Such a grip should be provided even under conditions where the external surface of the ball is covered with moisture.

One object of the invention is to provide an athletic ball which, in being thrown, can be very firmly gripped by the hand of the player.

Another object is to provide an improved inflatable ball of the carcass type.

Another object is to provide an improved structure of an athletic ball provided adjacent the external surface with lacing.

In the accompanying drawings:

Fig. 1 is an elevation of an oval football embodying our improvements;

Fig. 2 is a fragmentary view on a larger scale, showing that portion of the ball of Fig. 1 which is provided with lacing;

Fig. 3 is a section on line 3—3 of Fig. 2;

Fig. 3A is a section on line 3A—3A of Fig. 2;

Fig. 4 is a section similar to Fig. 3, showing the wall of the ball as it appears before the lacing is applied;

Fig. 5 is a fragmentary plan view of that portion of the ball shown in Fig. 4;

Fig. 6 is a sectional view showing one step in the manufacture of the ball;

Fig. 7 is a fragmentary plan view showing a modified form;

Fig. 8 is a section on line 8—8 of Fig. 7; and

Fig. 9 is a sectional view of a typical carcass, the finishing layer of the ball being omitted.

In the drawings, the ball selected for illustration is a generally oval football such as used in college football. In one embodiment the finishing layer of the ball is of rubber. In another embodiment the finishing layer is of leather. The term "rubber" is used in a broad sense in this description, so as to include rubberlike material as well as natural rubber or so-called synthetic rubber. The ball wall, to which the finishing layer of rubber, leather or other suitable material is applied, is constituted by a carcass, which carcass usually has, as an integral and permanent part thereof, a rubber bladder equipped with an inflating valve. Usually the inflating valve is of the type to receive a hollow needle by means of which the ball is inflated. The external surface of the ball is somewhat rough, as usual in footballs, the roughness being provided by the finishing of the external rubber layer or by the external surface of the leather layer or other external layer. This surface roughness facilitates to a degree the gripping of the ball by the hand. However, in itself it is quite insufficient, especially when the player grips the ball for executing a pass. To provide the additional necessary gripping surface, the ball is provided with lacing which extends along it at one side and is in part in an external projecting position with respect to the adjacent ball surface, as hereinafter described.

In Fig. 1 there is shown an oval football having a carcass, as hereinafter described, and having a finishing layer of rubber applied to the carcass, as indicated at 20, the outer surface of such layer being the outer surface of the ball. Extending along one side of the ball is a lacing 21, the lacing being constituted by a string or thong 22 of leather or other suitable material which is laced through suitable openings in the ball wall, as hereinafter described. The external surface of the finishing layer 20 may be roughened in any suitable way over the greater part of its area, and it may also have roughening provided by a slightly projecting rib 23 that is made integral with the layer 20, and extends around the ball longitudinally except for a certain space on one side of the ball where the lacing is provided. In the particular form shown, the rib 23 at each of its ends extends approximately to the adjacent end of the lacing, as shown, for example, at the left of Fig. 5, where the end of the rib is indicated at 24.

In the form shown in Figs. 1 to 6, inclusive, a carcass is used which has as an integral layer thereof a rubber bladder 25, this bladder being bonded to a layer 26. The structure of layer 26 is not shown in detail in Figs. 1 to 6, inclusive, but this layer is assumed to be constituted by twisted fibrous material, for example, fabric impregnated with rubber, and vulcanized to the bladder 25. The carcass wall also includes in this form an external layer of rubberized fabric, which layer is indicated at 27, and is bonded by vulcanizing to the layer 26 on the one hand and to the finishing layer 20 on the other hand. It is to be understood that in the completed ball, which is formed in a suitable mold, the layers 25, 26, 27 and 20 are all shaped, compressed and bonded together in a tough resilient wall. As will be made apparent hereinafter, however, the wall of the ball may be constructed in different ways.

In manufacturing the ball, the wall structure which is to receive the lacing is constructed in the manner shown in Figs. 4 and 5. In the example shown, an elongated opening or slot 28 is formed in the finishing layer between the ends 24 or rib 23. At opposite sides of this slot perforations 29 are provided in the finishing layer to receive the lacing, and in the example shown for purposes of illustration there are eight of these perforations at each side of the slot. Registering with these perforations are perforations 29$^a$ formed in the outer layer 27 of the carcass. In this region of the ball wall a layer 30 of strong fabric such as canvas is placed under a part of the layer 27 to act as a holding or anchoring means for the lacing, and provided in this holding or anchoring layer are perforations 29$^b$ registering with the perforations 29$^a$. The holding layer 30 is in the form of an elongated strip, which in this particular case is disposed in a recess in the layer 26 so that the outer surface of the holding strip is flush with the outer surface of layer 26. The holding strip is preferably substantially wider than the region of the ball that is limited at the sides by the respective rows of lacing holes, and in the form shown the side margins of the holding strip are extended laterally to an appreciable distance past the lacing holes for the purpose of providing laterally extended anchoring means in the carcass that will be very effective in anchoring the lacing when the lacing is subjected to various strains. Canvas is a satisfactory material for the holding strip, and it is indicated in Fig. 4, for example, that the strip is somewhat thicker than the covering layer of rubberized fabric that extends over it, but variation may be made in these and other respects. Underneath the holding strip is a layer of material which facilitates lacing of the ball particularly by providing for a space beneath the middle portion of the holding strip through which the lacing strip or thong can be passed in the lacing operation, and in this particular form the layer in question is one of glazed Holland cloth, or like slippery, smooth material. This layer of cloth will not adhere to the overlying layer of canvas, and, therefore, as will be understood, the lacing, being passed through the lacing holes, can be readily introduced between the last-mentioned layers. In the form shown, the strip 31 of Holland cloth, which is of small thickness in relation to the thickness of the canvas layer, is of materially less width than the canvas layer and extends laterally past the lacing holes to a slight extent only. This strip acts as a separator disposed under the canvas strip in the region between the holes for the purpose above explained, and it also acts as a separator in the region of the holes themselves, facilitating entry of the lacing into the holes. It does this because the construction provides for depression of a portion of the carcass wall to form a lacing-receiving depression or pocket, as indicated in Fig. 3, whereby it is made possible to lace the ball in a convenient manner, and in a minimum length of time. The bottom of the pocket, as shown in Fig. 3, is formed by the Holland cloth layer 31. While Holland cloth is preferred, other material may be placed in the ball wall in the specified location for serving the purposes above mentioned.

Figs. 2 and 3 show the lacing placed in the ball wall, and in this particular form the lacing thong is made in two separate pieces or sections, the lacing being of the type used at the present time in official footballs. It will be noted from the drawings that double plies of lacings extend transversely between opposite lacing holes, and the end portions of the respective thong sections which would otherwise be free are carried under the outermost of the transverse lacing plies so as to be held thereby. In the drawings, the lacing 21 comprises identical thong sections 32 and 33. Fig. 3 shows at 34 the pocket above strip 31 in which the crossed portions of the thong sections are received. Each section 32, 33, after being passed through the series of holes, has an end portion 35 that is extended between the lacing plies at the outside of the ball for holding them firmly in position. In Fig. 2 the free ends of the portions 35 are at the right-hand side of the figure, and they are indicated at 36.

The valve used for inflating the ball has been previously mentioned, and in Fig. 1 the inflating valve is indicated at 37. This valve may advantageously be a rubber valve of the kind disclosed in the DeLaney and Madsen Patent No. 2,065,121 of December 22, 1936. It is preferably located in an offset or remote location with respect to the lacing pocket, as shown.

In the process of making the ball, the bladder-equipped carcass, after being built up, has the outer rubber layer applied to it, and the ball is then formed in the mold, and usually vulcanization is effected while the ball is in the mold, while it is subjected internally to fluid pressure. In Fig. 6 there is shown a portion 38 of a suitable mold for this purpose. In the process of manufacturing the ball, the strip 31 is laid on the layer 26 in the proper relation, and then the layers 30, 27 and 20 are superimposed, the layer 30 preferably being countersunk, and all of these last-mentioned layers being provided at a suitable stage with the perforations which register with each other to create the lacing holes, as has been described above. For the purpose of correctly forming and maintaining the holes which are to receive the lacings, the mold portion 38 can be provided with projections 39 in the nature of cylindrical pins, which projections fill the holes and rest at their inner ends against the strip 31. Thus, when the article is stripped from the mold it will have accurately formed lacing holes.

In the modified form shown in Figs. 7 and 8, the finishing layer or veneer is of leather instead of rubber. The leather is usually cemented in sections to the outer surface of the carcass. It is preferable to provide orange-peel sections of leather. The leather pieces are perforated in a manner similar to the perforation of the rubber cover in the first form. In Figs. 7 and 8 one of the leather pieces is indicated at 40 and another at 41, these pieces being perforated to receive the lacings, and being separated from each other by a slot 42. In this case the dividing line between the sections, which is indicated at 43, is preferably in line with the slot 42. In other words, in this form the two lines of lacing holes are provided in separate leather sections, the division line of the sections being in line with the laced portion, and the slot 42 being in effect a continuation of the division line.

In making the form of ball shown in Figs. 7 and 8, the vulcanization of the carcass can be effected before the leather is applied. The carcass, prior to the application of the leather cover, will have a pocket similar to the pocket 34 and lacing holes open at the outer surface of the carcass and communicating with the pocket. Where the Holland cloth is used to form the pocket bottom, it provides a slippery surface that facilitates the introduction of the lacing, but the slippery surface might be provided in some other manner, and the slippery cloth strip, if used in constructing the ball, might under some circumstances be removed so as not to appear in the finished ball, or the layer introduced into this location might be of a different material.

In Fig. 9 there is shown a carcass wall structure in connection with which the invention can be used, which includes a plurality of textile threads or cords disposed on great circles and embedded in a rubber matrix. Here the bladder portion of the carcass is shown at 44, and applied to the bladder at the exterior is a layer 45 formed of rubberized fabric. Externally of layer 45 and bonded thereto is a layer 46, which includes thread windings disposed on great circles and embedded in a mass of rubber. Layer 47 is applied externally to layer 46 and bonded thereto, said layer 47 being made of rubberized fabric. Many other arrangements of layers may be used, however, in constructing the carcass. In the forms shown, the bladder is bonded to the carcass, and the outer carcass layer, to which a finishing layer is applied, is made of fabric, but changes can be made in these and other respects.

The invention provides a very superior form of athletic ball, and particularly a football, because of the fact that the ball can be handled so effectively, especially in throwing or passing. Usually, for throwing a pass, the ball is rested with the side thereof against the palm of the hand, and the ball is firmly grasped, usually with the thumb of the throwing hand lying over the lacing. The thumb engagement with the lacing is of great importance in gripping the ball firmly and effectively in the proper location on the ball surface, and in preventing slip and in directing the ball in its trajectory. The lacing arrangement provided by the invention admirably meets these conditions. Moreover, the ball is an especially strong and durable one, having a wall of great strength, and otherwise fulfilling the requirements made of balls of this character. Moreover, a lacing which will serve very satisfactorily in preventing the slipping of the ball in the hand of a skilled player can be applied to the ball in a relatively quick and convenient manner. Moreover, the lacing when placed in the ball wall is strongly held and anchored, and will not readily be torn loose, displaced or damaged under the severe strains to which the ball is subjected in play.

While some different embodiments of the invention are illustrated, it will be understood that various modifications and changes may be made in the structure without departing from the principles of the invention or the scope of the claims.

What we claim is:

1. An athletic ball having a valve-equipped inflatable carcass whose wall is continuous except for the valve area, a covering layer applied to the carcass and providing the external ball surface, and a removable lacing provided for hand-grip purposes threaded in place in the cover in a location remote from the valve.

2. An athletic ball having a valve-equipped inflatable inner part continuous except for the valve area, and a cover extending over the outer surface of said inner part, said ball having for purposes of effective hand grip an insertable and removable lacing member with portions projecting from the outer surface of the cover and other portions concealed in the ball in a pocket disposed between the inner part and the cover in an offset location with respect to the valve.

3. An athletic ball having an inflatable valve-equipped carcass and an outer cover applied to the carcass, the carcass being closed throughout its area except for the area of the valve, said ball having for purposes of effective hand grip a lacing member engaged with the carcass externally of the carcass, said lacing member projecting beyond the outer cover, the outer cover and the carcass being provided with perforations engaged by said lacing member, and the carcass having a pocket with a smooth bottom underlying and engaged by the lacing.

4. An athletic ball comprising a closed inflatable valve-equipped carcass having an internal bladder bonded thereto and having an external cover applied thereto, and a lacing member engaging perforations in the cover and carcass and disposed partially in an external pocket provided in the carcass, the valve of the carcass being in a location where it is remote from the pocket.

5. An athletic ball comprising an inflatable valve-equipped carcass and an outer cover applied thereto, the carcass being provided with a continuous wall portion in regions other than the valve area and a lacing member applied to said wall portion externally in a location offset from the valve and engaged in perforations in the cover and carcass, and an anchoring element firmly secured to the carcass anchoring the lacing member in the carcass.

6. An athletic ball of ovoid shape comprising an inflatable valve-equipped carcass and an outer cover applied thereto, the carcass being provided with a continuous wall portion in regions other than the valve area and a lacing member applied to said wall portion externally in a location offset from the valve and engaged in perforations in the cover and carcass, and an elongated longitudinal anchoring element firmly secured to the carcass anchoring the lacing member in the carcass, said anchoring element comprising a strip having laterally extending anchoring portions.

7. An athletic ball comprising an inflatable valve-equipped carcass and an outer cover applied thereto, the carcass being provided with a continuous wall portion in regions other than the valve area and a lacing member applied to said wall portion externally and engaged in perforations in the cover and carcass, and an anchoring element anchoring the lacing member in the carcass, said anchoring element comprising a strip having laterally extending anchoring portions firmly secured to the carcass, said strip having perforations through which the lacing member passes, and the carcass having perforations registering with said last-named perforations and disposed externally thereof.

8. An athletic ball having a hollow inflatable body including in its structure a valve-equipped inner bladder, an enclosing wall including a layer of rubberized fabric outside of the bladder to which the bladder is bonded, and a cover over said wall, said body having for purposes of effective hand grip a pocket external to said wall and an insertable and removable lacing member having portions secured within said pocket and other portions projecting exteriorly, the valve of the bladder extending into an opening in the cover disposed in a location offset from said pocket and lacing member.

9. An athletic ball having a valve-equipped bladder, an enclosing wall bonded to the bladder and continuous except for the valve area, and a cover over said wall, said ball having for purposes of effective hand grip an insertable and removable lacing member with portions projecting from the outer ball surface and other portions concealed in the ball in a location away from the valve in a lacing-receiving pocket between said enclosing wall and said cover.

10. An athletic ball as defined in claim 9 in which the lacing member is threaded through holes in the cover and holes in a layer of fabric which reinforces the ball wall.

ARTHUR R. GOW.
CORNELIUS J. CROWLEY.

REFERENCES CITED

The following references are of record in the file of this patent:

UNITED STATES PATENTS

| Number | Name | Date |
|---|---|---|
| Re. 17,057 | Voit | July 31, 1928 |
| 985,893 | Gamble | Mar. 7, 1911 |
| 1,621,043 | Turner | Mar. 15, 1927 |
| 2,182,053 | Reach | Dec. 5, 1939 |
| 2,194,132 | Voit et al. | Mar. 19, 1940 |